United States Patent [19]

Johnson et al.

[11] Patent Number: 4,851,990
[45] Date of Patent: Jul. 25, 1989

[54] HIGH PERFORMANCE PROCESSOR INTERFACE BETWEEN A SINGLE CHIP PROCESSOR AND OFF CHIP MEMORY MEANS HAVING A DEDICATED AND SHARED BUS STRUCTURE

[75] Inventors: William M. Johnson, San Jose, Calif.; Gigy Baror, Austin, Tex.

[73] Assignee: Advanced Micro Devices, Inc., Sunnyvale, Calif.

[21] Appl. No.: 12,226

[22] Filed: Feb. 9, 1987

[51] Int. Cl.$^4$ .................... G06F 13/40; G06F 13/42
[52] U.S. Cl. ................................ 364/200; 364/238.9; 364/240.2; 364/323.9
[58] Field of Search ... 364/200 MS File, 900 MS File

[56] References Cited

U.S. PATENT DOCUMENTS

| | | | |
|---|---|---|---|
| 3,813,651 | 5/1974 | Yamada | 364/200 |
| 3,938,098 | 2/1976 | Garlic | 364/200 |
| 4,263,649 | 4/1981 | Lapp, Jr. | 364/200 |
| 4,360,891 | 11/1982 | Branigin et al. | 364/900 |
| 4,507,732 | 3/1985 | Catiller et al. | 364/200 |
| 4,528,625 | 7/1985 | McDonough et al. | 364/200 |
| 4,592,010 | 5/1986 | Wollscheid | 364/900 |
| 4,617,662 | 10/1986 | Auer, Jr. et al. | 371/25 |
| 4,757,439 | 7/1988 | Stinson et al. | 364/200 |

Primary Examiner—Raulfe B. Zache
Assistant Examiner—Thomas C. Lee
Attorney, Agent, or Firm—Joseph J. Kaliko; J. Vincent Tortulano

[57] ABSTRACT

Methods and apparatus for realizing a high performance interface between a processor, constituting part of a reduced instruction set computer (RISC) system, and a set of devices, including memory means. According to the invention, the interface includes three independent buses. A shared processor output bus, a processor input instruction bus, and a bidirectional data bus. The shared processor output address bus coupled the processor and the computer's memory. This bus carries both instructon and data access signals being transmitted by the processor to the memory. The processor input instruction bus also couples the processor and the computer's memory means, but carries instruction signals being transmitted from the memory to the processor. The bidirectional data bus provides a signal path for carrying data signals being transmitted by the memory to the processor and vice-a-versa. The novel interface uses demultiplexed buses for simpler timing and uses the separate data and instruction buses to provide extremely high transfer rates at a reasonable cost. The shared address bus accommodates pipelined and burst mode processor protocols with the burst mode protocol allowing concurrent data and instruction transfers. Methods and apparatus for controlling the buses and reporting bus status, etc., are also part of the invention and facilitate the implementation of features that include status reporting, handshaking between devices and the RISC processor, and bus arbitration.

34 Claims, 4 Drawing Sheets

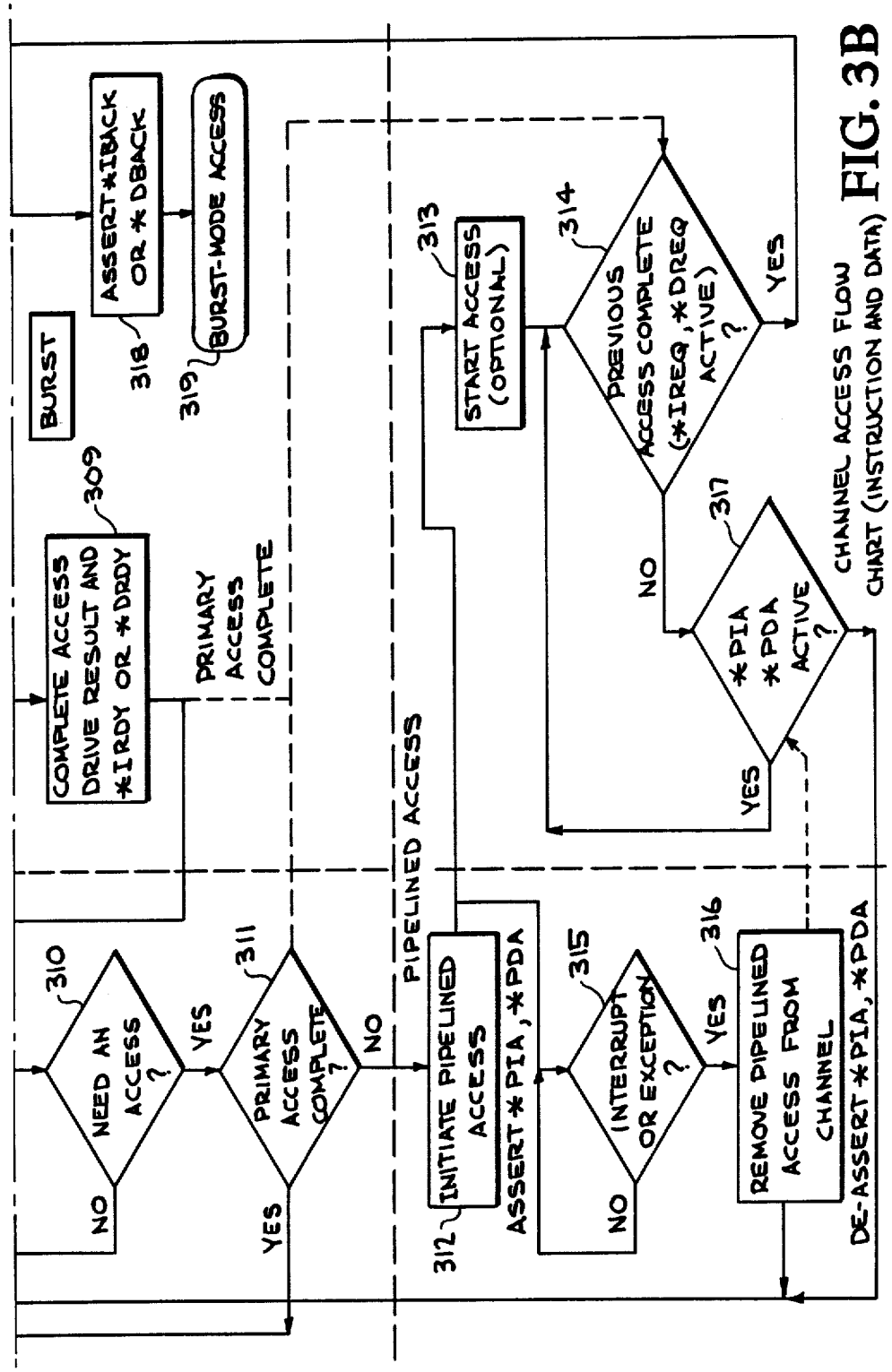
FIG. 3B CHANNEL ACCESS FLOW CHART (INSTRUCTION AND DATA)

HIGH PERFORMANCE PROCESSOR INTERFACE BETWEEN A SINGLE CHIP PROCESSOR AND OFF CHIP MEMORY MEANS HAVING A DEDICATED AND SHARED BUS STRUCTURE

BACKGROUND OF THE INVENTION

1. Field of the Invention

The invention generally relates to methods and apparatus for interconnecting a computer system's processor and a set of devices, including memory means. The invention particularly relates to a novel bus architecture and associated control techniques that may be used to achieve a low cost, high performance interface when used in a reduced instruction set computer (RISC) system to interconnect the RISC processor and the aforesaid devices.

2. Description of the Related Art

The bus architecture of a computer system is used for interfacing the system's processor(s) with a multiplicity of devices such as memory units, coprocessors, external devices, etc. The interface typically carries address, data and instruction signals, as well as various control and status signals.

In order to support the high data and instruction processing rates on modern computer systems, in particular RISC systems, it is essential that the interface design be uncomplicated, and be capable of moving information swiftly and without delay between the computer system's components. In other words, the interface must be capable of operating with a minimum of contention, timing constraints, buffering requirements, etc. In addition, it is important that the interface be cost effective, from an implementation point of view, to complement the overall lower cost of modern day computing systems.

In known systems, where processors are fabricated as integrated circuit packages, the interfaces use a variety of multiplexed and demultiplexed busing techniques in order to minimize the number of buses required to make up the interface and maximize the performance. This in turn has the effect of minimizing the number of processor interface interconnect pins which helps keep both processor chip and system design costs down.

In the known multiplexed bus schemes, the interface typically is comprised of separate instruction and data buses. For example, for 32 bit wide instructions and data, two buses, requiring a 64 pin processor interconnect, are typically used. One of the buses carries multiplexed signals representing data addresses and data. The other bus carries multiplexed signals representing instruction addresses and instructions. The disadvantages of the multiplexed bus schemes are difficulties in clocking the information, which affects performance; the need for multiplexing hardware, which affects cost and performance; and the potential for mismatches between the timing constraints associated with multiplexing the information, and the timing constraints of the memory and other subsystems of the computer.

Systems using pairs of demultiplexed buses (again for a 64 pin example), are prone to experience instruction and data contention problems. These systems normally have instruction and data address signals carried on one shared bus, and share an instruction/data bus for the instruction and data signals themselves.

The aforesaid data contention problems are particularly serious in RISC computer environments where the processor is capable of executing pipelined and burst mode protocols. As will be explained in detail hereinafter, execution of these protocols requires two or more processing cycles, with the potential for sequential data and/or instruction transfers spanning many cycles. Using a shared instruction/data bus in these cases would dramatically slow processing time exacerbating the aforesaid contention problem.

An apparent, but expensive, solution to the aforesaid problems would be to have four buses, one each for data, instruction, data address and instruction address signals. Totally separate and independent buses eliminate the multiplexing and contention problems. However, the system's design cost would go up and, for the 32 bit word example, the processor interface would require 128 bus pins.

It would be desirable to be able to take advantage of, and support the high data and instruction processing rates characteristic of, RISC processors, by providing a high performance system interface that is low cost, minimizes contention problems, timing constraints, etc. In particular, it would be desirable to utilize an interface that takes advantage of normal RISC processor characteristics, such as a single cycle execution time, explicit memory references for load, store and branch instructions, pipelined and burst mode operation capabilities, etc., to realize the desired high performance objective.

Additionally, it would be desirable to be able to achieve, at the nominal expense of increasing bus pin count from 64 pins to 96 pins (for systems having 32 bit wide instructions and data), an interface capability approximating the capability heretofore thought possible only by using a 4 bus, 128 pin interface; while avoiding the problems of the 2 bus, 64 pin interfaces discussed hereinbefore.

SUMMARY OF THE INVENTION

Methods and apparatus are disclosed for realizing a high performance interface between a processor, constituting part of a reduced instruction set computer (RISC) system, and a set of devices, including memory means.

According to the invention, the interface includes three independent buses. A shared processor address bus, a processor input instruction bus, and a bidirectional data bus.

The shared processor output address bus couples the processor and the computer's memory. This bus carries both instruction and data access signals being transmitted by the processor to the memory.

The processor input instruction bus also couples the processor and the computer's memory means, but carries instruction signals being transmitted from the memory to the processor.

The bidirectional data bus provides a signal path for carrying data signals being transmitted by the memory to the processor and vice-a-versa.

The novel interface uses demultiplexed buses for simpler timing and uses the separate data and instruction buses to provide extremely high transfer rates at a reasonable cost. The shared address bus accommodates pipelined and burst mode processor protocols with the burst mode protocol allowing concurrent data and instruction transfers.

Methods and apparatus for controlling the buses and reporting bus status, etc., are also part of the interface and facilitate the implementation of reporting features, bus arbitration, etc.

It is an object of the invention to provide a low cost, simply designed, high performance interface for the processor and a set of devices that includes memory, in a RISC system.

It is a further object of the invention to support the high data and instruction rates possible using a RISC system by providing a bus architecture that takes maximum advantage of the RISC environment by complementing the high processing rates possible by minimizing contention problems, bus architecture imposed timing constraints, etc.

It is yet another object of the invention, by way of its preferred embodiment, to effectively realize the capacity and processing power associated with a 128 pin processor interface (for 32 bit wide data and instructions), using only a 96 pin interface (for the buses themselves). The realization of this objective would have a direct impact on lowering chip fabrication and system design costs.

The novel interface features a bus architecture having synchronous, independent signal paths.

The novel interface also features the ability to support simple, pipelined and burst mode memory access protocols in a RISC environment, allowing for pipelined instruction and data accesses over the address bus, and the simultaneous transfer of data and instructions over the independent data and instruction buses.

These and other objects and features of the present invention will become apparent to those skilled in the art upon consideration of the following detailed description and the accompanying Drawing, in which like reference designations represent like features throughout the figures.

BRIEF DESCRIPTION OF THE DRAWING

FIGS. 3A and 3B combined represent a channel access flow chart depicting how the processor and slave devices cooperate to perform instruction and data accesses utilizing the protocols contemplated by the preferred embodiment of the invention.

DETAILED DESCRIPTION

Figure 1:
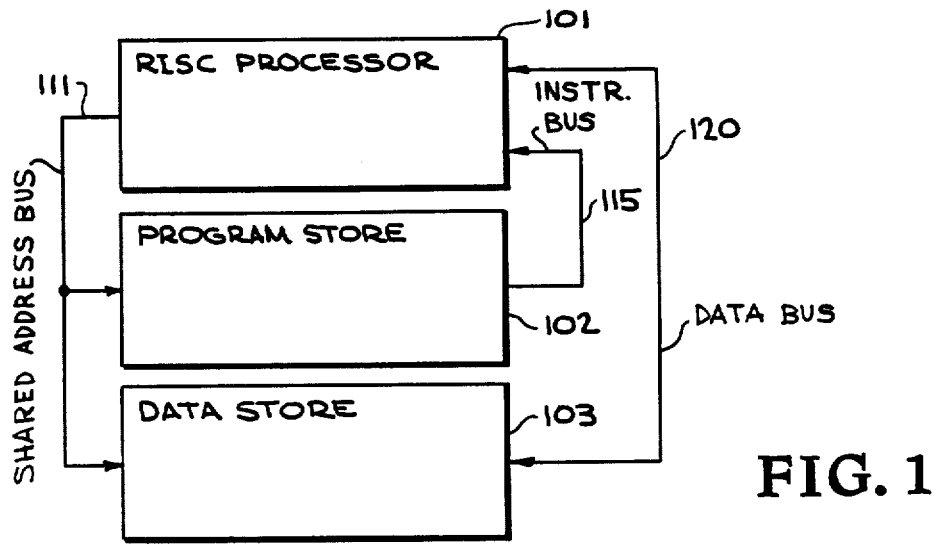
FIG. 1 depicts the configuration for the address, instruction and data buses that are part of the novel interface, shown interconnecting major computer system components.

FIG. 1 depicts the shared address bus and independent data and instruction buses included in the novel interface. The setting for the interface is a reduced instruction set computer system.

The block labeled 101 in FIG. 1 represents a RISC processor. Block 102 of FIG. 1 represents program store and block 103 of FIG. 1 represents data store.

RISC processor 101 is shown interconnected to program store 102 via the shared address bus which is labeled as bus 111. Bus 111 is also shown interconnecting processor 101 and data store 103.

The separate and independent instruction bus for carrying instruction signals transmitted by program store 102 to processor 101, is shown in FIG. 1 as bus 115.

The separate and independent data bus, for carrying data signals transmitted by data store 103 to processor 101, is shown in FIG. 1 as bus 120.

Not shown in FIG. 1, but possibly included in the set of devices being interfaced by the bus architecture to processor 101, are coprocessors, bus converters, devices coupled to but located outside the computer system itself (external devices), etc., all of which are well known to those skilled in the art.

A description of how the interface is controlled and utilized to support communications between processor 101, program store 102 and data store 103, when processor 101 is operating in a variety of access modes (each to be described in detail hereinafter), will demonstrate the interface's operability and utility. One of ordinary skill in the art will readily appreciate that the same teaching of how to use and control the interface between devices 101, 102 and 103, can be extended to support the use and control of the interface by other devices in said set of devices, that one desires to interface with processor 101.

Before proceeding with the description of how the interface may be utilized, a set of processor input and output signals has, in accordance with the preferred embodiment of the invention, been defined to facilitate the communication of both substantive and control information between processor 101 and the devices connected to it over the interface. These signals ar in one to one correspondence with the pins shown in the pin-out block depicted in FIG. 2.

For the sake of illustration only, a 32 bit instruction and data word architecture for the RISC system is assumed. One of ordinary skill in the art will appreciate that the illustrative embodiment in no way limits the implementation or scope of the invention with respect to computer systems having different word lengths.

Figure 2:
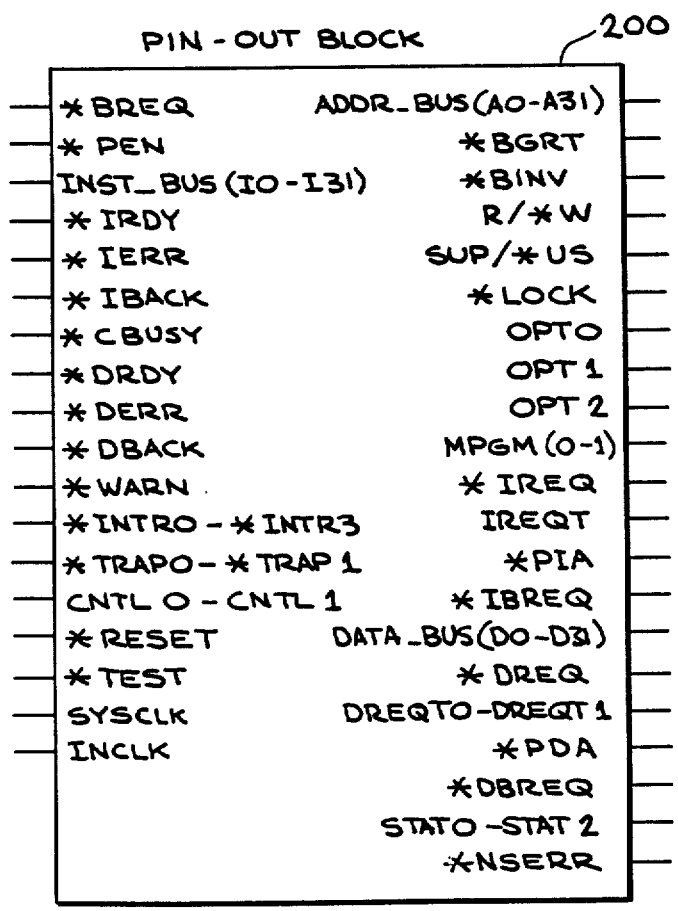
FIG. 2 depicts a pin-out diagram for an integrated circuit package that accommodates the novel interface.

Reference should now be made to FIG. 2 which depicts each input and output, to and from the RISC processor of the preferred embodiment of the invention, in the pin-out block form.

First, the 3 buses shown in FIG. 1 are depicted interconnected to block 200 of FIG. 2 via a 96 pin bus interconnect comprised of three sets of 32 pins each. The first set of 32 pins, constitutes shared bus 111 of FIG. 1 and is labeled "ADDR_BUS (A0-A31)" in FIG. 2. The second set of 32 pins, for the separate and independent instruction bus, bus 115 of FIG. 1, is labeled "INST_BUS (I0-I31)" in FIG. 2. Finally, the bidirectional data bus, bus 120 of FIG. 1, may be seen interconnected to block 200 by the 32 pin interconnect labeled "DATA_BUS (D0-D31)" in FIG. 2.

The 32 bit wide address bus, 111, transfers the byte address for all accesses by processor 101 to either program store 102 or data store 103, except burst mode accesses which take place in the manner to be described in detail hereinafter. The 32 bit wide instruction bus, 115, transfers instructions transmitted by program store 102 to processor 101. The 32 bit wide data bus, 120, may be used to transfer data, in either direction, between processor 101 and data store 103, for load and store operations.

Not shown in FIG. 1, but included in the novel interface, are the signal paths interconnected to block 200 via the remaining pin-outs depicted in FIG. 2. The purpose of each interconnect in the context of the preferred embodiment of the invention is as follows.

Bus Request, *BREQ in FIG. 2, is an input that allows external devices to arbitrate for control of the buses (collectively hereinafter sometimes referred to as the processor channel). This input is asserted by an external device when it needs to perform a data or instruction transaction. Processor 101 completes any pending transaction (stopping any burst transactions), at which point buses 111, 115 and 120 are granted. Processor 101 drives bus 111 and its associated control signals to a high-impedance state, asserts the bus invalid signal, *BINV (to be explained hereinafter) for one cycle, and asserts the bus grant signal, *BGRT (also explained hereinafter). Data bus 120, and the controls associated with data bus 120 and instruction bus 115, are also driven to the high-impedance state. While the *BREQ input is asserted, processor 101 continues to assert *BGRT. The cycle after *BREQ is deasserted, *BINV is asserted for a cycle, and *BGRT is deasserted. In the following cycle, the processor has mastership of the buses and may use them.

The bus grant, *BGRT output, is used to grant the buses and associated control signals to an external bus master. It is asserted when processor 101 is able to release buses 111, 115 and 120, and the associated controls. Again, *BGRT is deasserted the cycle following deassertion of *BREQ.

The bus invalid, *BINV output, is used to signal that processor 101 has released address bus 111, but that another device may not yet have taken control. It defines an idle cycle for the channel, invalidating address bus 111.

The read/write, R/*W, signal indicates the direction of a transaction. When high, the processor is requesting data from memory or devices; when low, it is sending data to memory or devices. It is a valid signal when address 111 is valid.

The supervisor/user mode, SUP/*US, output indicates the program mode for an access.

The lock, *LOCK, output allows the implementation of various channel and device interlocks. It may be active only for the duration of an access, or active for an extended period of time. The processor does not relinquish the channel (in response to *BREQ) when *LOCK is active.

The MMU Programmable, MPGM (0-1), outputs reflect the value of two bits in a translation look-aside buffer (TLB) entry that is associated with the access. If no address translation is performed, these signals are zeros.

The pipeline enable, *PEN signal, allows devices which can support pipelined accesses (i.e. which have input latches for the address and required controls) to signal the processor that a second access may begin while a first access completes. The pipeline access mode, as indicated herein-before, will be explained in detail hereinafter.

The instruction request, *IREQ signal, is a processor request for an instruction access. When it is active, the address for the access appears on address bus 111.

The instruction request type, IREQT, signal specifies the address space of an instruction request when *IREQ is active. According to the preferred embodiment of the invention, instructions may be stored in instruction memory (which may include part of memory 103 as well as portions of program store 102) or a separate read only memory (ROM) space incorporated in program store 102. Furthermore, according to the preferred embodiment, when IREQT is low, the access is an Instruction-Memory access; when IREQT is high, an Instruction-Read-Only-Memory access is signaled.

The pipelined instruction access, *PIA signal, is a processor output signal that indicates that an instruction access is pipelined with another, in-progress, instruction access. The pipelined instruction access cannot complete until the first access has been completed. The completion of the first access is signalled by the assertion of *IREQ by the processor.

The instruction burst request, *IBREQ signal, is used by the processor to establish a burst mode instruction access and to request instruction transfers during a burst mode instruction access. *IBREQ may be active even though the bus 111 is being used for a data access. This signal becomes valid late in the processor cycle, with respect to *IREQ.

Instruction ready, *IRDY, is a processor input signal that indicates a valid instruction is on instruction bus 115. Processor 101 ignores this signal if there is no pending instruction access.

Instruction error, *IERR, is a processor input signal that indicates an error occurred during the current instruction access. If this signal is recognized, the processor ignores the content of instruction bus 115, and an instruction access exception trap occurs. The processor ignores this signal if there is no pending instruction access.

Instruction burst acknowledge, *IBACK, is an active processor input whenever a burst mode instruction access has been established. It may be active even though no instructions are currently being accessed.

The data request, *DREQ signal, is used by the processor to request a data access. When it is active, the address for the access appears on address bus 111.

The data request type (DREQT0-DREQT1) signals specify the address space of a data access, as follows:

| DREQT1 | DREQT0 | Meaning |
|---|---|---|
| 0 | 0 | Data-memory access |
| 0 | 1 | Input/output access |
| 1 | x | Coprocessor transfer |

An interrupt/trap vector request is indicated as a data-memory read. If required, the system can identify the vector fetch by the STAT0-STAT2 outputs which will be discussed hereinafter.

Option Control (OPT0-OPT2), are processor output signals that, according to the preferred embodiment of the invention, reflect the value of bits 18-16 of the load or store instruction which begins an access. These signals may be used to control external hardware in a system-dependent fashion. Any interpretation of these signals is possible. However, if compatibility issues are important, the following interpretation (based on DREQT) may be used (the value "x" is a don't care):

| DREQT1 | DREQT0 | OPT2 | OPT1 | OPT0 | Meaning |
|---|---|---|---|---|---|
| 0 | x | 0 | 0 | 0 | Word-length access |
| 0 | x | 0 | 0 | 1 | Byte access |
| 0 | x | 0 | 1 | 0 | Half-word access |

| DREQT1 | DREQT0 | OPT2 | OPT1 | OPT0 | Meaning |
|---|---|---|---|---|---|
| 0 | x | 0 | 1 | 1 | 24-bit access |
| 0 | 0 | 1 | 0 | 0 | Instruction ROM access (as data) |
| all others | | | | | reserved |

The pipelined data access, *PDA output signal, indicates that a data access is pipelined with another, in progress, data access. The pipelined data access cannot complete until the first (primary) access has completed. The completion of the first access is signaled by the assertion of *DREQ.

Data burst Request, *DBREQ, is a signal that may be used to establish a burst mode data access and to request data transfers during a burst mode data access. *DBREQ may be active even though address bus 111 is being used for an instruction access. This signal becomes valid late in the cycle with respect to *DREQ.

Data Ready, *DRDY, is a processor input signal which, for loads, indicates that valid data is on data bus 120. For stores, it indicates that the access is complete, and that data need no longer be driven on data bus 120. Processor 101 ignores this signal if there is no pending data access.

Data Error, *DERR, is a processor input signal that indicates an error occurred during the current data access. For a load, the processor ignores the content of the data bus 120. For a store, the access is terminated. In either case, a data access exception trap occurs. Processor 101 ignores this signal if there is no pending data access.

Data burst acknowledge *DBACK, is an active input signal whenever a burst mode data access has been established. It may be active even though no data are currently being accessed.

Coprocessor busy, *CBUSY, is an input signal that indicates that a coprocessor is performing an operation, and can accept no operands or operation codes. When operands or operation codes are sent to the coprocessor, the processor does not expect a *DRDY signal; an inactive level on *CBUSY informs the processor that the coprocessor has accepted the operands or operation codes.

Warn, *WARN, is a processor input that causes a non-maskable warn trap to occur whenever there is a high to low transition of this input signal. The warn trap bypasses the normal vector fetch sequence, and is useful in situations where the vector fetch may not work (e.g. when data memory is faulty).

The interrupt request (*INTR0-*INTR3) input signals generate prioritized interrupt requests. According to the preferred embodiment of the invention, the interrupt caused by *INTR0 has the highest priority, and the interrupt caused by *INTR3 has the lowest priority.

The trap request(*TRAP0-*TRAP1), input signals, generate prioritized trap requests. The trap caused by *TRAP0 has the highest priority.

Copending U.S. patent application Ser. No. 942,472 filed Dec. 16, 1986, hereby incorporated by reference, defines a test interface for a RISC processor. This interface is a subset of the overall interface described herein.

The use of the CPU status (STAT0-STAT2) pins, the CPU control (CNTL0-CNTL1) pins; the reset (*RESET); test mode (*TEST), and master/slave error (*MSERR) pins, are all described in detail in the aforesaid application.

System clock, SYSCLK, is either a clock output with a frequency which is half that of INCLK (to be described hereinafter), or an input from an external clock generator at the processor's operating frequency.

Finally, with respect to the input clock, INCLK signal and pin, when processor 101 generates the clock for the system, INCLK is an oscillator input to the processor, at twice the processor's operating frequency. In systems where the clock is not generated by the processor, the INCLK signal is tied to a constant level.

It should be noted that, according to the preferred embodiment of the invention, all outputs (except *MSERR) may be placed in a high-impedance state by the TEST mode. This too is described in greater detail in the incorporated patent application pertaining to the test portion of the interface.

Having described in detail the set of processor input and output signals communicated over and used to control the novel interface, a brief recap of the function of these signals by logical grouping, together with the description of how the interface supports a variety of processor access modes, will now be set forth. This description will demonstrate both the operation and utility of the invention.

Once again, the interface (or channel) is comprised of three, 32-bit synchronous buses. Additionally, the interface is comprised of means for carrying the control and status signals associated with the three buses. FIG. 2 depicts an integrated circuit chip package with a sufficient number of pins to carry all of the aforementioned signals. The set of signals defined hereinbefore allows, among other things, control of the channel to be relinquished to an external master.

There are five logical groups of signals (with some overlap) performing five distinct functions, as follows:

1. Instruction Address Transfers and Instruction Access Requests (signals on A0-A31, SUP/*US, MPGM0-MPGM1 *PEN, *IREQ, IREQT, and *PIA);

2. Instruction Transfer (signals on I0-I31, *IBREQ, *IRDY, *IERR, and *IBACK);

3. Data Address Transfers and Data Access Requests (signals on A0-A31, R/*W, SUP/*US, *LOCK, MPGM0-MPGM1, *PEN, *DREQ, DREQT0--DREQT1, OPT0-OPT2, and *PDA);

4. Data Transfers (signals on D0-D31, *DREQ, *DRDY, *DERR, and *DBACK) and;

5. Arbitration (signals on *BREQ,*BGRT, and *BINV).

According to the preferred embodiment of the invention, two types of user-defined outputs are available on the channel to control devices and memories directly in a system dependent manner. Each of these outputs is valid simultaneously with; and for the same duration as; the address for an access.

The first set of user-defined signals, MPGM0 MPGM1 is, as indicated hereinbefore, determined by bits in a translation look-aside buffer used in translating the address for an access. If address translation is not performed, these bits, in the preferred embodiment of the invention, have the value 00.

The second set of signals, OPT0-OPT2, are determined, according to the preferred embodiment of the invention, by bits 18-16 of the load or store instruction which initiates an access. These signals are valid only for data accesses, and have a predefined interpretation for coprocessor data-transfers.

Since the OPT0–OPT2 signals are determined by instructions, they may have an impact on application-software compatibility in certain cases. If compatibility of application software among different systems is of concern, then the recommended interpretations of OPT0–OPT2 should be used in the design of system hardware. In any event, a value of 000 on these signals should be defined to have no special effect on an access.

Instruction accesses and data accesses utilizing the channel will now be described.

According to the preferred embodiment of the invention, instruction accesses occur to one of two address spaces; Instruction-Memory space and Instruction-Read-Only-Memory (ROM) space. The distinction between these two address spaces is made by the IREQT signal, which is in turn derived from a ROM enable bit in a current processor status register. The Instruction-Memory and Instruction-ROM address spaces are distinct address spaces; each space may be independently populated based on the needs of a particular system. Obviously, the instruction spaces for a given computer system may be varied according to the system's needs and the disclosed instruction spaces (and data address spaces as well) are presented for the sake of illustration only, in no way meaning to limit the scope of the invention described herein.

It should also be noted that Instruction-Memory space does not have to be independent of Data-Memory address space. Although the channel supports separate Instruction-Memory and Data-Memory address spaces, the memory-management unit may not. In certain systems, it may be required to access instructions via loads and stores, even though instructions may be contained in physically-separate memories. For example, this requirement might be imposed because of the need to set instruction breakpoints. Note also that the OPT signals may be used to allow the access of instructions in the Instruction-ROM space, using loads and stores.

All processor instruction fetches are read-accesses, so the value of the R/*W signal is irrelevant for instruction fetches.

The preferred embodiment of the invention also calls for data accesses to occur to one of three address spaces; Data-Memory space, Input/Output (I/O) space, and Coprocessor space. The distinction between these spaces is made by the DREQT0–DREQT1 signals, which in turn are determined by the load or store instruction which initiates a data access. Each of these address spaces is distinct from the others; however, the Data-Memory space may be common to the Instruction-Memory space, as indicated hereinbefore.

Data accesses may occur either from a slave device or memory to the processor (for a load), or from the processor to a slave device or memory (for a store). The direction of transfer is determined by the R/*W signal. In the case of a load, the processor requires that data on data bus 120 to be held valid only for a small duration of time before the end of a cycle. In the case of a store, the processor drives the bus 120 as soon as it becomes available, and holds the data valid until the slave device or memory signals that the access is complete.

The successful completion of an instruction access is indicated by an active level on the *IRDY input, and the successful completion of a data access is indicated by an active level on the *DRDY input. If there are exceptional conditions for which an instruction or data access cannot complete successfully, the unsuccessful completion is indicated by an active level on the *IERR or *DERR input, as appropriate.

According to the preferred embodiment of the invention, if the processor receives an *IERR or *DERR in response to an instruction or data access, the content of the instruction or data bus—and the value of *IRDY or *DRDY—is ignored. An *IERR response causes an instruction access exception trap, unless it is associated with an instruction which the processor does not ultimately execute (because of a non-sequential instruction fetch). A *DERR response always causes a data access exception trap. According to the preferred embodiment of the invention, the instruction access exception and data access exception traps cannot be masked, so they may be used to report hardware errors which cannot be ignored.

The novel channel supports three protocols for accesses; simple, pipelined, and burst-mode.

The various protocols are defined to accommodate minimum-latency accesses as well as maximum-transfer-rate accesses. An access may complete in a single cycle, although the access protocols support accesses requiring arbitrary numbers of cycles. Address transfers for accesses may be independent of instruction or data transfers.

Each of the access protocols is described in detail hereinafter with reference to FIGS. 3A, 3B and 4–6.

Figure 3A:
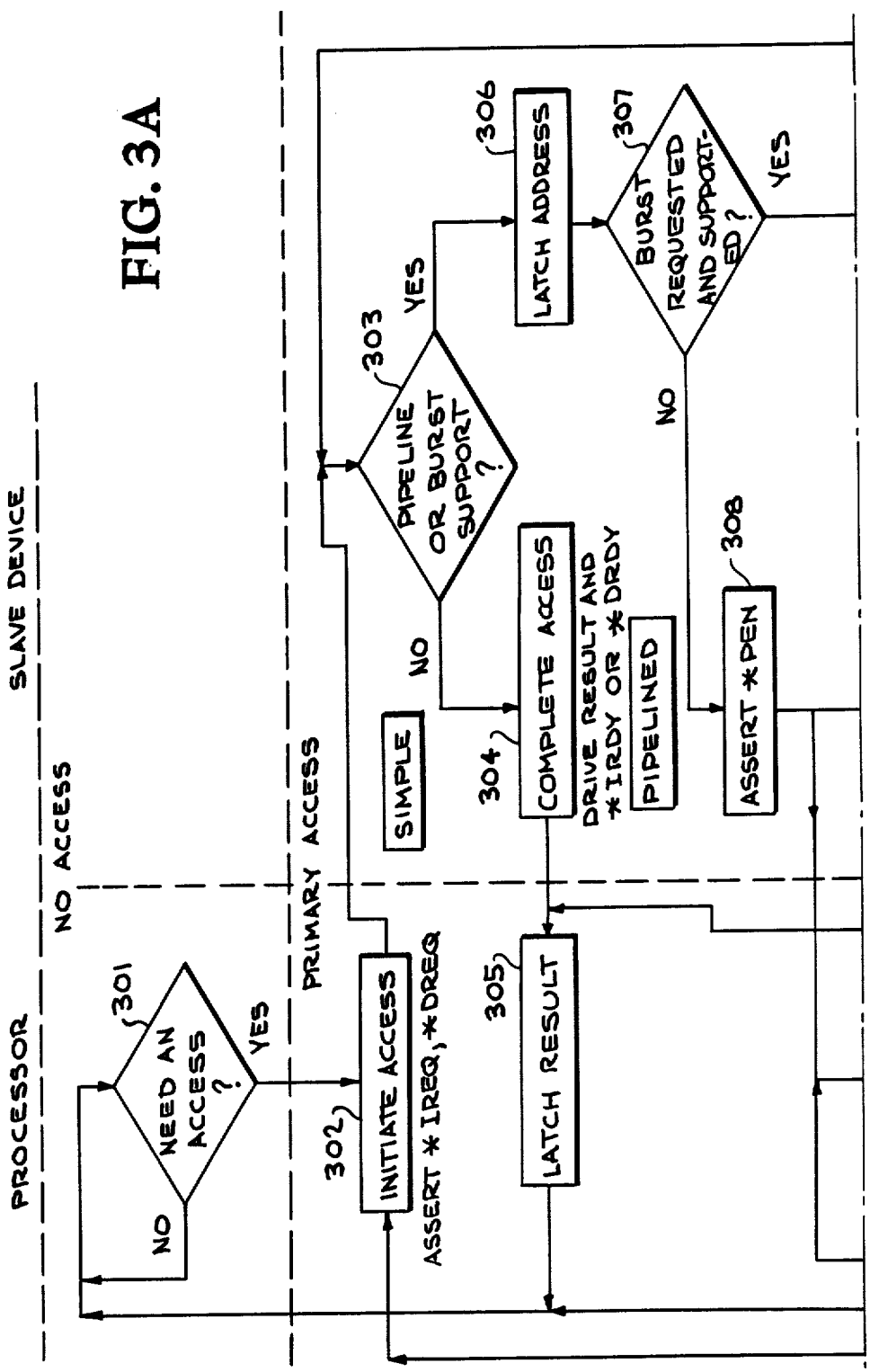

FIGS. 3A and 3B combined represent a channel access flow chart depicting how the processor and slave devices cooperate to perform instruction and data accesses utilizing the protocols contemplated by the preferred embodiment of the invention.

The flow chart in FIGS. 3A and 3B may be seen to have 3 vertical segments (no access, primary access and pipelined access) and left and right hand segments (processor operation and slave device operation respectively). It should be noted that flow chart applies independently to program and data accesses.

The flow chart in FIGS. 3A and 3B shows that the processor repeatedly checks to see if a data or instruction access is required (decision block 301). This is depicted in the "no access" portion of the flow chart.

When the need for an access is recognized, the "primary access" portion of the control flow chart is entered. The access is initiated by the processor (block 302). The slave device then determines if pipelined or burst support (these modes to be described hereinafter in detail) is required (block 303). If not, a simple access is completed (block 304) with the result and *IRDY or *DRDY being driven over the interface by the slave device. The processor latches the result (block 305), and the simple access is complete.

It should be noted that for a simple access, the processor holds the address valid throughout the entire access. This protocol is used for single cycle accesses, and for accesses to simple devices and memories. On any cycle before the completion of the access, a simple access may be converted to a pipelined access (by the assertion of *PEN) or to a burst-mode access (by the assertion of *IBACK or *DBACK, if the processor is asserting *IBREQ or *DBREQ). Thus, the protocol for simple accesses may also be used during the initial cycles of pipelined and/or burst-mode accesses. This is advantageous, for example, in cases where the slave device or memory either requires the address to be held for multiple cycles at the beginning of the pipelined or burst-mode access, or cannot respond to the pipelined or burst-mode request within one cycle.

A timing diagram illustrating the various signals and information flow for a simple access instruction read is set forth in FIG. 4, to be described hereinafter.

Returning to the flow chart shown in FIGS. 3A and 3B, in the event pipelined or burst support is indicated (the block 303 test), the processor address is latched (block 306) and a further test for a burst request is made (block 307).

How the interface supports pipelined and burst mode accesses will now be described.

A pipelined access is one which starts before an earlier, in-progress access completes. The in-progress access is called a primary access, and the second access is called a pipelined access. The primary and pipelined access referred to correspond to the primary and pipelined access segments shown in the combined FIG. 3A/FIG. 3B control flow chart.

A pipelined access is of the same type as the primary access. For example, an instruction access which begins before the completion of a data access is not considered to be a pipelined access, whereas a second data access is. The novel interface accommodates only one pipelined access at any given time.

For accesses which require more than one cycle to complete, pipelined accesses have better performance than simple accesses, because they allow the overlap of portions of two different accesses. However, devices and memories which support pipelined accesses must contain some means for storing the address and other information about the access, and are somewhat more complex than devices and memories which support only simple operations. Support for pipelined operations is required for both the primary access access and pipelined access. No device or memory is required to support pipelined operations.

The processor attempts to complete every access as a pipelined access; the input *PEN (block 308 of FIG. 3A) indicates whether or not pipelining is supported for a given access. The *PEN input can be driven by individual devices, or can be tied active or inactive to enable or disable system-wide pipelined accesses. The processor ignores the value of *PEN unless it is performing an access.

The processor samples *PEN on every cycle during a primary access. If *PEN is active on any cycle, the processor ceases to drive the address and associated controls for the primary access on the next cycle. If the processor requires another access before the primary access completes (see blocks 310 and 311 of FIG. 3B) it drives the address and controls for the second access, asserting the *PIA or *PDA output, as shown in block 312 of FIG. 3B, indicating that the second access is a pipelined access. The output *IREQ or *DREQ, as appropriate, is not asserted for a pipelined access. Devices and memories which cannot support pipelined accesses can therefore ignore *PIA and/or *PDA, and base their operation upon *IREQ and/or *DREQ.

A device or memory which receives a request for a pipelined access may treat it as any other access, with one exception; the pipelined access cannot use data bus 120 or instruction bus 115. In the case of a data read or instruction access, the results of the access cannot be driven on the appropriate bus; in the case of a data write, the data does not appear on the data bus. Any other operations for the access, such as address decoding, (block 313), can occur as for any other access.

When the primary access completes (as indicated at block 309 of FIG. 3B by the assertion of *IRDY or *DRDY), the pipelined access becomes a primary access (block 314). The processor indicates this by asserting *IREQ or *DREQ, depending on the type of access. The device or memory performing the pipelined access may complete the access as soon as *IREQ or *DREQ (see block 314) is asserted (possibly in the same cycle). When the access becomes a primary access, it controls the channel as any other primary access. For example, it may determine whether or not another pipelined access can be performed.

When the pipelined access becomes a primary access, the output *PIA or *PDA remains asserted for one cycle. In the cycle after *IREQ or *DREQ is asserted, *PIA or *PDA is de-asserted. This insures continuity of control within the slave device or memory.

If the processor takes an interrupt or trap (block 315) before a pipelined access becomes a primary access, the request for the pipelined access is removed from the channel (block 316). This may occur, for example, when *IERR or *DERR is signalled for the primary access. If the pipelined access is removed from the channel, the slave device or memory does not receive an *IREQ or *DREQ for the pipelined access. Hence, the pipelined access does not become a primary access, so it cannot complete (see block 317). Because of this, a pipelined access should not change the state of a slave device or memory until the pipelined access becomes a primary access.

Because of internal data-flow constraints, the processor does not perform a pipelined store operation while a load is in progress. However, the protocol of the channel allows any operation to be pipelined with any other. Thus, other channel masters may perform a pipelined store during a load.

A timing diagram illustrating the various signals and information flow for a pipelined instruction read is set forth in FIG. 5, to be described hereinafter.

Finally, with respect to FIGS. 3A and 3B, if burst mode processing is indicated (at block 307) the slave device asserts *IBACK or *DBACK, as appropriate (block 318) and a burst mode access is commenced (block 319).

A burst-mode access allows multiple instructions or data words at sequential addresses to be accessed with a single address transfer. The number of accesses performed, and the timing of each access within the sequence, is controlled dynamically by the burst-mode protocol. Burst-mode accesses take advantage of sequential addressing patterns, and provide several benefits over simple and pipelined accesses:

1. Simultaneous instruction and data accesses. Burst-mode accesses reduce the utilization of the Address Bus. This is especially important for instruction accesses, which are normally sequential. Burst-mode instruction accesses eliminate most of the address transfers for instructions, allowing address bus 111 to be used for simultaneous data accesses.

2. Faster access times. By eliminating the address transfer cycle, burst-mode accesses allow addresses to be generated in a manner which improves access times.

3. Faster memory access modes. Many memories have special, high-bandwidth access modes (e.g. static-column page mode and nibble mode). These modes generally require a sequential addressing pattern, even though addresses may not be explicitly presented to the memory for all accesses. Burst-mode accesses allow the use of these access modes, without hardware to detect sequential addressing patterns.

A burst-mode access as supported by the novel interface is, according to the illustrative example to be set forth herein, in one of the following operational conditions at any given time:

1. Established. The processor and slave device have successfully initiated the burst-mode access. A burst-mode access which has been established is either active or suspended. An established burst-mode access may become preempted, terminated, or cancelled.

2. Active. Instruction or data accesses and transfers are being performed as the result of the burst-mode access. An active burst-mode access may become suspended.

3. Suspended. No accesses or transfers are being performed as the result of the burst-mode access, but the burst-mode access remains established. Additional accesses and transfers may occur at some later time (i.e. the burst-mode access may become active) without the retransmission of the address for the access.

4. Preempted. The burst-mode access can no longer continue because of some condition, but the burst-mode access can be reestablished within a short amount of time.

5. Terminated. All required accesses have been performed.

6. Cancelled. The burst-mode access can no longer continue because of some exceptional condition. The access may be re-established only after the exceptional condition has been corrected, if possible.

Each of the above conditions, except for the terminated condition, is under the control of both the processor and slave device or memory. The terminated condition is determined by the processor, since only the processor can determine that all required accesses have been performed. A description of each of the above conditions with respect to the burst-mode protocol is set forth immediately hereinafter.

First, with respect to establishing a burst-mode access, the processor attempts to perform all instruction prefetches as burst-mode accesses. For data accesses, the processor attempts to perform load-multiple and store-multiple operations using burst-mode accesses. The inputs *IBACK and *DBACK indicate that a requested burst-mode access is supported. The processor ignores the value of *IBACK unless it is performing an instruction access, and it ignores the value of *DBACK unless it is performing a load-multiple or store-multiple.

The processor indicates that it desires a burst-mode access by asserting *IBREQ or *DREQ during the cycle that the address for the access is placed on address bus 111. It should be noted, however, that these signals become valid later in the cycle than the address. The processor continues to drive *IBREQ or *DBREQ on every cycle for which the address is valid on the address bus. During this time, the device or memory involved in the access may assert *IBACK or *DBACK to indicate that it can perform the burst-mode access. If *IBACK or *DBACK (as appropriate) is asserted while the initial address appears on the address bus, the burst-mode access is established.

If the burst-mode access is not established on the first access, the processor attempts to establish a burst-mode access on each subsequent address transfer, as long as there are more accesses yet to be performed. During any subsequent access, the addressed device or memory may establish a burst-mode access by asserting *IBACK or *DBACK. If the burst-mode access is never established, the default behavior is that the processor transmits an address for every access.

After the burst-mode access is established, the interpretation of *IBREQ and *DBREQ are changed. These signals are used during subsequent accesses to indicate that the processor requires at least one more access. If *IBREQ or *DBREQ is active at the end of the cycle in which an access successfully completes (i.e. when *IRDY or *DRDY is active), the processor requires another access. If the slave device or memory has not previously preempted the burst-mode access, and neither preempts nor cancels (by asserting *IERR or *DERR) the burst-mode access in the cycle that the access completes, the additional access must be performed.

The immediate execution of instructions cannot be guaranteed, so that, in certain situations, a burst-mode instruction access must be suspended. If *IBREQ is inactive during the cycle in which an instruction access completes, the burst-mode access is suspended (if it is neither preempted nor cancelled). The burst-mode access remains suspended unless the processor requests a new instruction access (in which case *IREQ is asserted), or unless the instruction memory preempts the burst-mode access.

A suspended burst-mode instruction access becomes active whenever the processor can accept more instructions. The processor activates the burst-mode access by asserting *IBREQ; if the instruction memory does not preempt the burst-mode access during this cycle, an instruction access must be performed.

When a suspended burst-mode instruction access is activated, the resulting instruction access is not permitted to complete in the cycle in which *IBREQ is asserted, but may complete in the next cycle. The reason for this restriction is that the burst-mode protocol is defined such that the combination of an active level on *IBREQ and *IRDY causes an instruction access (as previously discussed). If the instruction access completes immediately in the cycle that a suspended burst-mode access is activated, there is an ambiguity in the protocol; it is possible to interpret a single-cycle assertion of *IBREQ as a request for two instructions. This ambiguity is resolved by delaying the instruction access for a cycle. Since this restriction applies only when the processor's instruction prefetch buffer is full and the instruction memory is capable of a very fast access, the delayed instruction response has no performance impact in the preferred system context in which the invention is used.

The system does not suspend burst-mode data accesses, because the data transfers occur to and from general-purpose registers, which are always available. However, other channel masters may suspend burst-mode data accesses (during direct memory accesses, for example). The principles for suspending burst-mode accesses are the same as those for instruction accesses discussed above.

The processor may preempt, terminate, or cancel a burst-mode access by de-asserting *IBREQ or *DBREQ, and asserting *IREQ or *DBREQ at some later point. Normally, the processor receives one more instruction or data word after *IBREQ of *DBREQ is de-asserted. However, note that this access may complete in the same cycle that *IBREQ or *DBREQ is de-asserted. During the period after *IBREQ or *DBREQ is de-asserted and before *IREQ or *DREQ is asserted, the burst-mode access is in a suspended condition. The slave device or memory cannot—and need not—distinguish between preempted, terminated, and cancelled burst-mode accesses when they are caused by the processor.

The processor preempts a burst-mode access when an external channel master arbitrates for the channel, and when a burst-mode fetch crosses a potential virtual-page boundary. According to the preferred system in which the invention is being described, the minimum page size is 1 kilo-byte. As a result, burst-mode instruction and data accesses are preempted whenever the address sequence crosses a 1 kilo-byte address boundary. Obviously, this will vary depending on the page size of the system in which the novel interface is being used. The burst is re-established as soon as new address translation is performed (if required). A new physical address is transmitted when the burst-mode access is re-established. Note that this preemption is advantageous for devices or memories which require counters to follow the burst-mode address sequence. Since all burst-mode accesses are full-word accesses, and the processor re-transmits an address at every 1 kilo-byte address boundary, an 8-bit counter in the slave device or memory is sufficient to follow the burst-mode address sequence. Additional address bits are simply latched.

According to the preferred system context in which the invention is used, the processor terminates a burst-mode access whenever all required instructions or data have been accessed. Additionally, the processor cancels a burst-mode access when an interrupt or trap is taken.

The slave device or memory involved in a burst-mode access may preempt the access by de-asserting *IBACK or *DBACK. The processor samples *IBACK and *DBACK when *IRDY and *DRDY are active, so that *IBACK and *DBACK may be de-asserted as the last supported access is completed. However, *IBACK and *DBACK may also be de-asserted in any cycle before the access completes. If *IBACK or *DBACK is de-asserted when the processor is in a state where it expects an access, the access must be completed.

In general, the slave device or memory preempts the burst-mode access whenever it cannot support any further accesses in the burst-mode sequence. This normally occurs whenever an implementation-dependent address boundary is encountered (for example, a cache-block boundary), but may occur for any reason. By preempting the burst-mode access, the slave receives a new request, with the address of the next instruction or data word required by the processor.

The slave device or memory may cancel a burst-mode access by asserting *IERR or *DERR in response to a requested access. The signals *IBACK or *DBACK need not be de-asserted at this time, but should be de-asserted in the next cycle. Note that the *IERR and *DERR signals cause non-maskable traps, except in the case where *IERR is asserted for an instruction which the processor does not execute.

What has been described hereinabove in detail is how the novel interface may be used to support the aforementioned protocols.

Figure 4:
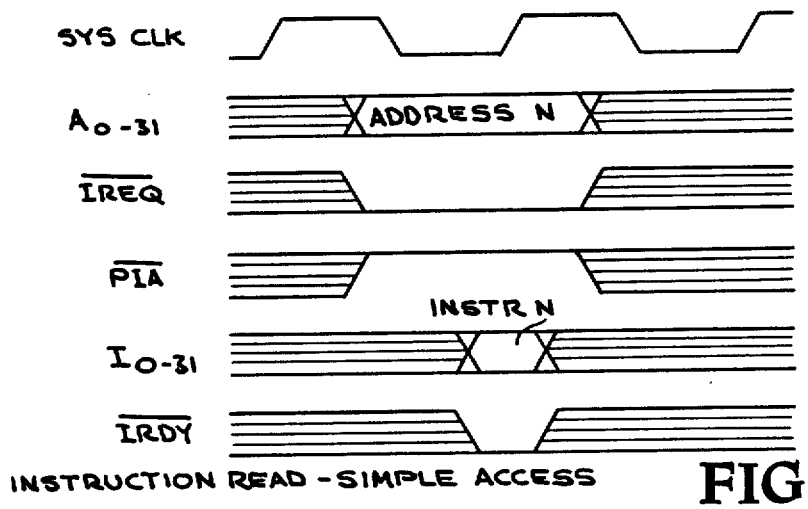
FIG. 4 is a timing diagram depicting the state of various bus and control signals, over time, when the interface depicted in FIG. 1 is used to perform a simple access instruction read.
Figure 5:
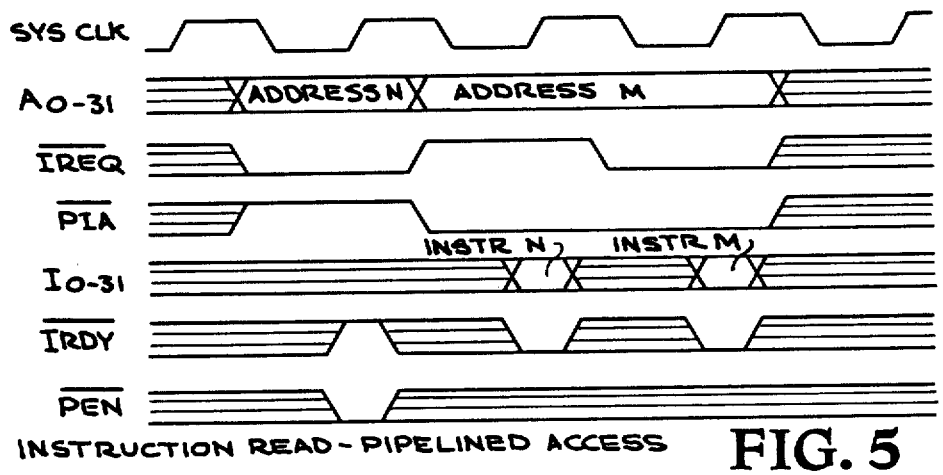
FIG. 5 is a timing diagram depicting the state of various bus and control signals over time, when the interface depicted in FIG. 1 is used to perform a pipelined access instruction read.
Figure 6:
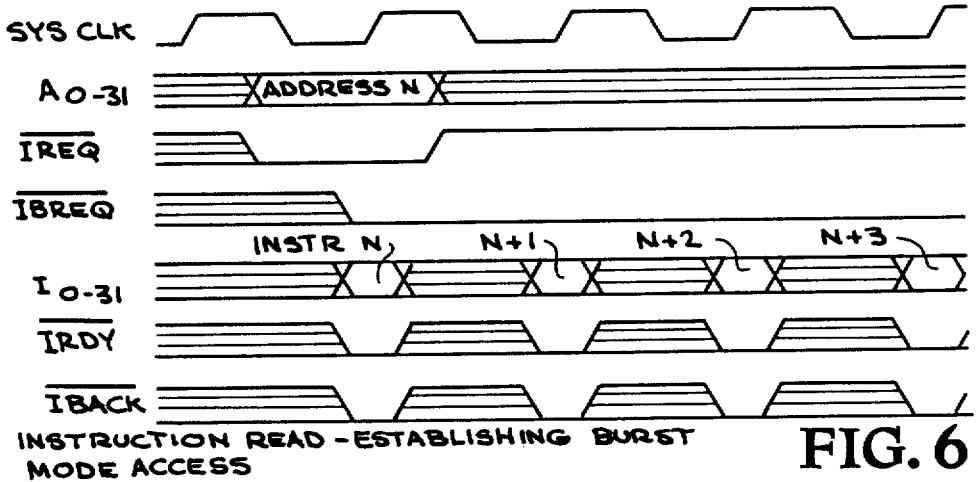
FIG. 6 is a timing diagram depicting the state of various bus and control signals, over time, when the interface depicted in FIG. 1 is used to perform a burst mode access instruction read.

In order to summarize the description of the access protocols and interface signalling used to support them, FIG. 4 through 6 are presented. These figures set forth timing diagrams which illustrate a simple, pipelined and burst-mode instruction read, respectively. One of ordinary skill in the art will readily appreciate that other timing diagrams can be developed for various other operations, such as data transfers in each of the above referenced modes, etc., all of said operations being supported by the interface and the set of signals defined herein.

In each of FIGS. 4 through 6 a clock cycle is defined to begin with the rising edge of a clock pulse.

FIG. 4 depicts two clock cycles over which a simple access instruction read is performed.

The address of the desired instruction is placed on address bus 111 (pins A0–A31 of FIG. 2) during cycle 1. *IREQ is shown asserted by the processor while *PIA is not asserted, indicating no pipeline support is required.

The instruction located at address n can be seen as transmitted to the processor over the interface (pins I0–I31) by the end of clock cycle 1. The instruction ready (*IRDY) signal is shown asserted indicating to the processor that a valid instruction has been fetched and placed on the instruction bus.

FIG. 5 depicts four clock cycles over which a pipelined instruction read is performed.

During clock cycle 1 an address, n, is placed on address bus 111, pins A0–A31. The primary access is initiated by *IREQ being asserted by the processor during clock cycle 1. Since pipeline support is contemplated *PEN is also shown asserted towards the end of clock cycle 1. This ties in with block 308 of FIG. 3. During clock cycle 2 the pipelined access may be observed with reference to FIG. 5 since *IREQ is de-asserted and *PIA is asserted. The pipelined address, m, is shown on bus 111 during cycle 2 as well.

By the end of cycle 2, the instruction located at address n has been retrieved, shown on instruction bus 115, pins I0–I31. At the same time *IRDY is asserted, indicating that the primary access is complete. At this point the pipelined access of cycle 2 becomes the primary access (as discussed hereinbefore with reference to FIG. 3) of cycle 3. The slave can complete the access after *IREQ is once again asserted (see cycle 3) by the processor.

It may be seen with reference to FIG. 5 that the instruction located at address m appears on instruction bus 115 at the end of cycle 3. *IRDY is once again asserted indicating a valid instruction signal has been transmitted over the interface during cycle 3.

Finally, FIG. 6 depicts four clock cycles over which a burst mode access is established for an instruction read.

During clock cycle 1 the start address for fetching instructions, address n is shown on address bus 111 (pins A0–A31), *IREQ is asserted by the processor and *IBREQ (instruction burst request) is also signalled over the interface. The handshaking between the processor and slave device should be observed with the *IBREQ, *IBACK handshake each cycle keeping the burst mode active. The sequential instructions located at addresses n, n+1, n+2, etc. are shown placed during successive clock cycles on instruction bus 115. Finally, *IRDY is asserted each cycle by the slave device, signalling a new valid instruction has been transmitted over the interface.

What has been described with reference to FIGS. 3 through 6, is an interface capable of supporting the signalling, status reporting, etc., associated with the afore-mentioned RISC system operating protocols. Once again, the interface requires only the 3 buses described hereinabove to support all three protocols achieving significant savings in chip fabrication and system design costs.

For the sake of completeness, bus arbitration, the electrical considerations related to bus sharing and channel behavior for interrupts and traps will also be described herein.

As far as arbitration is concerned, external masters can gain access to the address, data, and instruction buses by asserting the *BREQ input. The processor completes any pending access, preempts any burst mode access, and asserts the *BGRT output. At this time, the processor places all channel outputs associated with the address, data, and instruction buses in the high-impedance state. For the first cycle that *BREQ is asserted, the output *BINV is also asserted. If the external master cannot control the address bus and associated controls in the cycle that *BGRT is asserted, the active level on *BINV may be used to define an idle cycle for the channel (i.e. any spurious access requests are ignored). The *BINV signal is asserted only for a single cycle, so the external master must take control of the channel in the cycle after *BGRT is asserted.

While the *BREQ input remains asserted, the processor continued to assert *BGRT. The external master has control over all channel signals during this time.

To release the channel to the processor, the external master de-asserts *BREQ, but must continue to control the channel for the first cycle in which *BREQ is de-asserted. In the cycle after *BREQ is de-asserted, the processor asserts *BINV and de-asserts *BGRT; the external master should release control of the channel at this time. On the following cycle, the processor de-asserts *BINV, and is able to use the channel. The processor reestablishes any burst mode access preempted by arbitration.

The processor does not relinquish the channel when the *LOCK signal is active. This prevents external masters from interfering with operations which must exclude all other accesses on the channel.

As far as the electrical considerations of bus sharing are concerned, when buses are shared among multiple masters and slaves, it is important to avoid situations where multiple masters or slaves are driving a bus at the same time. This may occur when more than one master or slave is allowed to drive a bus in the same cycle, because bus arbitration is incompletely or incorrectly performed. However, it also occurs when a master or slave releases a bus in the same cycle that another master or slave gains control, and the first master or slave is slow in disabling its bus drivers, compared to the point at which the second master or slave begins to drive the bus. The latter situation is called a bus collision in the following description.

In addition to the logical errors which can occur when multiple devices drive a bus simultaneously, such situations may cause bus drivers to carry large amounts of electrical current. This can have a significant impact on driver reliability and power dissipation. Since bus collisions usually occur for a small amount of time, they are of less concern, but may contribute to high-frequency electro-magnetic emissions in a system. The system in which the novel channel is used is defined to prevent all situations where multiple drivers are driving a bus simultaneously. However, bus collisions may be allowed to occur, depending on the system design.

In the case of the novel channel, arbitration for the channel prevents the processor from driving the address and data buses at the same time as another channel master. If there is more than one external master, the system design must include some means for insuring that only one external master gains control of the channel, and that no external master gains control of the channel at the same time as the processor.

When the processor relinquishes control of the channel to an external master, bus collisions may be prevented by not allowing the external master to drive any bus while *BINV is active. This insures that all processor outputs are disabled by the time the external master takes control of the channel. However, there is nothing in the channel protocol to prevent the external master from taking control as soon as *BGRT is asserted.

Slave devices and memories are prevented from simultaneously driving the Instruction Bus or Data Bus by allowing only the device or memory performing a primary access to drive the appropriate bus. When a pipelined access becomes a primary access, it may drive the instruction or data bus immediately, so that there is a potential bus collision if the pipelined access is performed by a slave other than the slave performing the original primary access. This bus collision may be prevented by restricting all slaves to driving the instruction and data buses in the second half-cycle (using SYSCLK, for example). Since the processor samples data only at the end of a cycle, this restriction does not affect performance.

When the processor performs a store immediately following a load, it drives the data bus for the store in the second cycle following the cycle in which the data for the load appears on the data bus. This provides a complete cycle for the slave involved in the load to disable its data drivers. If the store is a pipelined access, it does not become a primary access until the data for the access appears on the data bus. The processor continues to drive the data bus until it receives a *DRDY or *DERR in response to the store; it ceases to drive the data bus in the cycle following the response.

Finally, if an interrupt or trap is taken, any burst mode accesses, according to the preferred embodiment of the invention, are cancelled. If a request for a pipelined access is on the address bus, this request is removed, and the vector-fetch request or instruction-fetch request replaces the pipelined-access request. Any other accesses are completed, and no new accesses started, other than those required for the interrupt or trap.

When the interrupt or trap processing is complete, any cancelled burst transactions are re-established, using the address of the access which was to be performed next when the interrupt or trap was taken. Uncompleted pipelined accesses are restarted, either by the interrupt return sequence in the case of an instruction access, or by restarting the initiating instruction in the case of a data access.

What has been described herein are methods and apparatus for achieving a high performance interface between a processor constituting part of a reduced instruction set computer (RISC) system, and a set of devices including memory means. These methods and apparatus meet the objectives set forth hereinbefore.

The foregoing description of a preferred embodiment and illustrative examples of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A high performance interface between a single chip processor, constituting part of a reduced instruction set computer (RISC) system, and a set of off chip devices, including memory means, said processor having a plurality of different off chip memory access protocols, wherein said interface comprises:
   (a) a shared processor output address bus, coupling said processor and said off chip memory means, for carrying both instruction and data access signals being transmitted by said processor to said off chip memory means;
   (b) a dedicated processor input instruction bus, coupling said processor and said off chip memory means, for carrying only instruction signals being transmitted by said off chip memory means to said processor; and
   (c) a bidirectional data bus coupling said processor and said off chip memory means, for carrying data signals being transmitted by said off chip memory means to said processor and for carrying data signals being transmitted by said processor to said off chip memory means, which in at least one of said protocols operates simultaneously with said dedicated processor instruction bus.

2. An interface as set forth in claim 1 further comprising a plurality of signal paths used for carrying signals belonging to a set of processor and device generated signals which are used to control said buses.

3. An interface as set forth in claim 2 wherein said buses are synchronous, independent signal paths.

4. An interface as set forth in claim 2 wherein said buses, said signal paths and said set of signals support the performance of a simple memory access protocol by said processor.

5. An interface as set forth in claim 2 wherein said buses, said signal paths and said set of signals support the performance of a pipelined memory access protocol by said processor.

6. An interface as set forth in claim 5 in which both pipelined instruction accesses and pipelined data accesses may be performed by said processor over said address bus.

7. An interface as set forth in claim 2 wherein said buses, said signal paths and said set of signals support the performance of a burst mode access protocol by said processor.

8. An interface as set forth in claim 2 wherein said buses, said signal paths and said set of signals support the performance of simple memory access, pipelined memory access and burst mode memory access protocols by said processor.

9. An interface as set forth in claim 2 over which data accesses and data transfers may be performed during the same clock cycle as instruction accesses and instruction transfers.

10. An interface as set forth in claim 2 wherein said address bus, said instruction bus and said data bus are each 32 bits wide.

11. An interface as set forth in claim 10 in which each of said buses is interconnected to said processor via a 32 pin signal interface forming a part of the integrated circuit package containing said processor.

12. An interface as set forth in claim 1 wherein said plurality of signal paths are each interconnected to said processor via a separate pin signal interface forming a part of the integrated circuit package containing said processor.

13. An interface as set forth in claim 2 wherein said buses are demultiplexed.

14. An interface as set forth in claim 2 over which instruction accesses by said processor may be selectively made to an instruction memory space and an instruction read only memory space( where both of said spaces are included in said off chip memory means.

15. An interface as set forth in claim 14 wherein said memory space selection by said processor is signalled to said off chip memory means over one of said plurality of signal paths via the state of an instruction request signal included in said set of processor generated signals.

16. An interface as set forth in claim 2 over which data accesses by said processor may be selectively made to a data memory space, an input/output space and a coprocessor space, where all of said spaces are included in said off chip memory means.

17. An interface as set forth in claim 16 wherein said memory space, selected by said processor is signalled to said off chip memory means over two of said plurality of signal paths via the state of a two bit data request signal.

18. A high performance interface between a single chip processor, constituting part of a reduced instruction set computer (RISC) system, and a set of off chip devices, including off chip memory means, said processor having a plurality of different off chip memory access protocols, wherein said interface comprises:
   (a) a shred processor output address bus, coupling said processor and said off chip memory means, for carrying both instruction and data access signals being transmitted by said processor to said off chip memory means;
   (b) a dedicated processor input instruction bus, coupling said processor and said off chip memory means, for carrying only instruction signals being transmitted by said off chip memory means to said processor;
   (c) a bidirectional data bus coupling said processor and said off chip memory means, for carrying data signals being transmitted by said off chip memory means to said processor and for carrying data signals being transmitted by said processor to said off chip memory means, which in at least one of said protocols operates simultaneously with said dedicated processor instruction bus; and
   (d) a plurality of signal paths used for carrying signals belonging to a set of processor and off chip device generated signals which are used to control said buses.

19. An interface as set forth in claim 18 in which said set of signals include instruction address transfer and instruction address request signals.

20. An interface as set forth in claim 18 in which said set of signals include instruction transfer signals.

21. An interface as set forth in claim 18 in which said set of signals include data address transfer and data address request signals.

22. An interface as set forth in claim 18 in which said set of signals include data transfer signals.

23. An interface as set forth in claim 18 in which said set of signals include bus arbitration signals.

24. An interface as set forth in claim 18 in which said set of signals include bus status and test signals.

25. A method for achieving a high performance interface between a single chip processor constituting part of a reduced instruction set computer (RISC) system, and a set of off chip devices, including off chip memory means, said processor having a plurality of different off chip memory access protocols, comprising the steps of:
(a) transmitting instruction and data access signals from said processor to said off chip memory means utilizing a shared address bus;
(b) transmitting instructions from said off chip memory means to said processor via a dedicated instruction bus, independent of said shared address bus; and
(c) transmitting data between said processor and said off chip memory means via data bus which is independent of both said dedicated instruction bus and said address bus and which in at least one of said protocols operates simultaneously with said dedicated processor instruction bus.

26. A method as set forth in claim 26 further comprising the step of transmitting over a plurality of signal paths, signals belonging to a set of processor and off chip device generated signals which are used to control said buses.

27. A method as set forth in claim 25 wherein said steps of transmitting are all performed synchronously.

28. A method as set forth in claim 26 further comprising the step of performing a simple memory access protocol utilizing the combination of said processor, said off chip memory means, said buses, said set of signals and said signal paths.

29. A method as set forth in claim 26 further comprising the step of performing a pipelined memory access protocol utilizing the combination of said processor, said off chip memory means, said buses, said set of signals and said signal paths.

30. A method as set forth in claim 29 wherein said step of performing a pipelined memory access protocol includes the performance of pipelined instruction accesses and pipelined data accesses over said shared address bus.

31. A method as set forth in claim 26 further comprising the step of performing a burst mode access protocol utilizing the combination of said processor, said off chip memory means, said buses, said set of signals and said signal paths.

32. A method as set forth in claim 25 in which the steps of transmitting said data access signals and said data may be performed during the same clock cycle as the steps of transmitting of said instruction access signals and said instructions.

33. A method as set forth in claim 25 in which said step of transmitting instruction access and data access signals further includes the step of signalling which of a plurality of instruction spaces is being accessed by said processor.

34. A method as set forth in claim 25 in which said step of transmitting instructions and data access signals further includes the step of signalling which of a plurality of data spaces is being accessed by said processor.

* * * * *